J. J. LANGER.
CABLE FASTENING.
APPLICATION FILED NOV. 23, 1920.
1,410,482.
Patented Mar. 21, 1922.
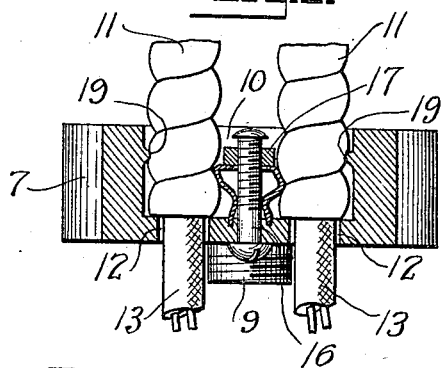
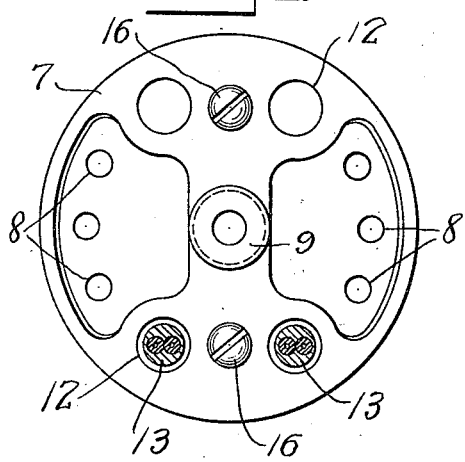
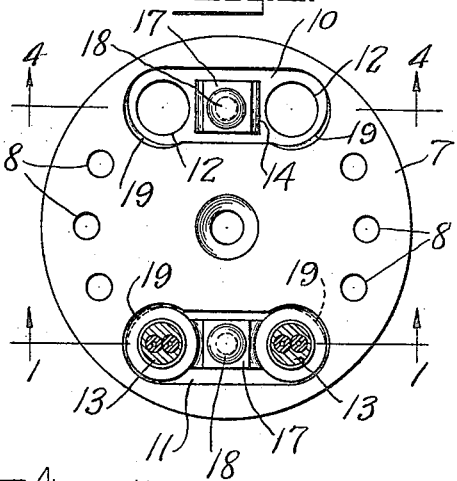
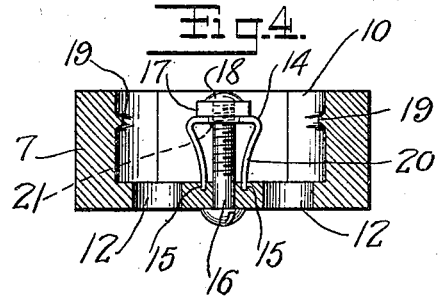
Inventor
Julius J. Langer
By his Attorney
Philip S. McLean.

UNITED STATES PATENT OFFICE.

JULIUS J. LANGER, OF NEW YORK, N. Y., ASSIGNOR TO STANDARD FLEXIBLE CONDUIT CORPORATION, OF NEW YORK, N. Y., A CORPORATION OF NEW YORK.

CABLE FASTENING.

1,410,482.   Specification of Letters Patent.   Patented Mar. 21, 1922.

Application filed November 23, 1920. Serial No. 426,075.

*To all whom it may concern:*

Be it known that I, JULIUS J. LANGER, a citizen of the United States, and a resident of New York, county of New York, and State of New York, have invented certain new and useful Improvements in Cable Fastenings, of which the following is a specification.

My invention relates to fastenings for armored cable, flexible conduit and the like, and the objects of the invention are to provide a simple, practical and durable anchorage device for securing the ends of the armored cable or conduit and which, furthermore, can be operated from the front or exposed face of the support with which the cable or conduit is engaged.

In order that the invention may be fully understood and its several advantages appreciated, I have illustrated in the accompanying drawing a simple commercial embodiment of the same, but wish it understood that the structure may be modified more or less to meet different requirements, without departure from the true spirit of the invention, as will be apparent from the scope of the appended claims.

Figure 1 in the drawing referred to is a side elevation and part sectional view of the device used for securing the ends of two sections of armored cable, the sectional portion being taken on substantially the plane of line 1—1 of Figure 3.

Figure 2 is a front or face view of the device with the ends of the cables shown in section.

Figure 3 is a rear view, the cables also appearing in section here.

Figure 4 is a cross sectional view taken on substantially the plane of line 4—4 of Figure 3.

The body of the device consists of a support 7 which may be a cover for a conduit box, a chandelier supporting plate or the like and which, as indicated in Figures 2 and 3, may have openings 8 therethrough for the passage of supporting screws or the like, and a centrally threaded boss 9 for the chandelier or other fixture.

The support or bracket 7 is provided in the back or rear face thereof with one or more seats or depressions 10 arranged in the illustration to receive the ends of two sections of armored cable 11, conduit or the like. The front of the support has openings 12 therethrough for the passage of the conductor cords 13.

The ends of the cable or conduit are anchored in the seats 10 by deformable fastenings 14 consisting in this disclosure of pieces of relatively soft sheet metal strap bent to substantially triangular form with the base of the triangle toward the rear of the bracket and the ends of the triangle seated in positioning slots 15 (Figure 4) in the back of the front wall of the support.

These positioning slots, in the illustration, are located at opposite sides of the screw 16 by which the anchorage is collapsed and preferably comparatively close to said screw so that the screw may operate as a brace and stop to limit the inward buckling movement of the legs of the clamping yoke (Figure 1). The collapsing force is applied to the base of the yoke, in the illustration, by means of a nut 17 engaged on the inner or rearward end of the screw and I have shown the extended end of the screw as headed over somewhat at 18 to prevent loss of the nut after the parts are assembled.

A further gripping effect is obtained on the cable or conduit in the construction illustrated by a rib or ribs 19 on the inner end walls of the depressions 10 which operate in effect as abutments to bite into the sheathing or armor when lateral pressure is applied by the clamping yoke.

In using the invention, the cable or the armor is inserted in the seat 10 and then the screw 16 is turned to bring a collapsing force on the inner or rear end of the deformable yoke. This causes the legs of the yoke to buckle and the head of the yoke to flatten out or expand laterally into gripping engagement with the sheating or armor, as I have indicated in Figure 1. The sides or legs of the yoke may have an initial slight inward bend, as indicated at 20 in Figure 4 so as to cause them to collapse inwardly when pressure is applied, thus effecting an engagement with the screw which braces the lower portion of the device and causes the upper or head portion of the member to more readily flatten outwardly and assume the shape of the adjacent face of the armor. This latter is a feature of special importance because in each instance the yoke adapts itself to the particular contour before it, the metal in effect " flowing " into the cavities or depressions in the armor so as to interlock firmly therewith. The opening through the head of the yoke for the screw bolt is preferably relatively large, as I have indicated at 21 so as to make the yoke practically free of the screw-threads, and therefore free to collapse and to bend to suit the particular requirements of the installation.

The yoke and ribs 19 are preferably so related that in the final position the holding portions of the yoke will lie below the ribs, as indicated in Figure 1, so as in effect to bend the armor over the ribs. At the present time, I find a certain grade of soft steel to be particularly desirable as a material for the yoke since this material bends easily so as to conform to the contour of the cable armor, and when once set, serves to anchor the armor fixedly in place. The invention, however, is not limited to this particular material or grade of material. It will be noted that it is a folded edge of the deformable element which is forced into holding engagement with the cable or conduit. This increases the area of the holding surface and also braces and strengthens the same.

What I claim is:

1. A fastening for armored cable or conduit comprising a support having a seat for the cable or conduit, an anchorage member in said seat consisting of a strap of deformable metal bent into substantially triangular form with a base portion and convergent arms extending therefrom and terminating in free ends, said anchorage member being arranged with the ends of said arms engaged with the back of the support and a screw carried by the support and exerting pressure on the base portion of the triangular member to deform the base and arm portions of said member laterally into engagement with adjoining sections of cable or conduit positioned in the seat aforesaid.

2. A fastening for armored cable or conduit comprising a support having a seat for the cable or conduit, an anchorage member in said seat consisting of a strap of deformable metal bent into substantially triangular form with a base portion and convergent arms extending therefrom and terminating in free ends, said anchorage member being arranged with the ends of said arms engaged with the back of the support and a screw carried by the support and exerting pressure on the base portion of the triangular member to deform the base and arm portions of said member laterally into engagement with adjoining sections of cable or conduit positioned in the seat aforesaid, said screw extending between the convergent arms and through the base portion of the anchorage member and thereby positioned to operate as a stop limiting the collapsing movement of the arms toward each other.

3. A fastening for armored cable or conduit comprising a support having a seat for the cable or conduit, an anchorage member in said seat consisting of a strap of deformable metal bent into substantially triangular form with a base portion and convergent arms extending therefrom and terminating in free ends, said anchorage member being arranged with the ends of said arms engaged with the back of the support and a screw carried by the support and exerting pressure on the base portion of the triangular member to deform the base and arm portions of said member laterally into engagement with adjoining sections of cable or conduit positioned in the seat aforesaid, the support having positioning slots receiving the ends of the triangular anchorage member to position and prevent lateral displacement of the same while the deforming pressure is being applied thereto.

4. A fastening for armored cable or conduit comprising a support having a seat for the cable or conduit, an anchorage member in said seat consisting of a strap of deformable metal bent into substantially triangular form with a base portion and convergent arms extending therefrom and terminating in free ends, said anchorage member being arranged with the ends of said arms engaged with the back of the support and a screw carried by the support and exerting pressure on the base portion of the triangular member to deform the base and arm portions of said member laterally into engagement with adjoining sections of cable or conduit positioned in the seat aforesaid, said screw having a nut thereon at the back of the base portion of the member and by means of which the deforming pressure is directly applied to said member.

In witness whereof, I have hereunto set my hand this 1st day of November, 1920.

JULIUS J. LANGER.